(12) United States Patent
Toyozumi et al.

(10) Patent No.: US 8,091,949 B2
(45) Date of Patent: Jan. 10, 2012

(54) ARRANGEMENT STRUCTURE OF DOOR WIRE HARNESS

(75) Inventors: Morihiro Toyozumi, Yokkaichi (JP); Takashi Suzuki, Yokkaichi (JP); Tetsuya Fujita, Yokkaichi (JP); Isao Tsuji, Yokkaichi (JP); Tsutomu Sakata, Yokkaichi (JP); Daiki Nagayasu, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 0 days.

(21) Appl. No.: 12/746,831

(22) PCT Filed: May 27, 2008

(86) PCT No.: PCT/JP2008/059699
§ 371 (c)(1),
(2), (4) Date: Jun. 8, 2010

(87) PCT Pub. No.: WO2009/075120
PCT Pub. Date: Jun. 18, 2009

(65) Prior Publication Data
US 2010/0283288 A1    Nov. 11, 2010

(30) Foreign Application Priority Data

Dec. 12, 2007    (JP) .................................. 2007-321328

(51) Int. Cl.
*B60J 7/00* (2006.01)
(52) U.S. Cl. .............. 296/146.7; 174/152 G; 174/153 R
(58) Field of Classification Search ............... 296/146.7, 296/146.9, 208; 174/152 G, 153 G
See application file for complete search history.

(56) References Cited

U.S. PATENT DOCUMENTS

| 6,135,538 | A  | * | 10/2000 | Serizawa et al. ........... 296/146.7 |
| 6,354,651 | B1 | * | 3/2002  | Mori .......................... 296/146.1 |
| 6,431,642 | B2 | * | 8/2002  | Sora et al. .................... 296/208 |
| 2005/0148212 | A1 | | 7/2005 | Ojima et al. |

FOREIGN PATENT DOCUMENTS

| JP | 58-20405 | 4/1983 |
| JP | 11-255042 | 9/1999 |
| JP | 2001-151043 | 6/2001 |
| JP | 2002-354634 | 12/2002 |
| JP | 2005-178466 | 7/2005 |

* cited by examiner

*Primary Examiner* — Joseph Pape
(74) *Attorney, Agent, or Firm* — Greenblum & Bernstein P.L.C.

(57) ABSTRACT

In an arrangement structure for a door wire harness, the door wire harness is arranged in a door of a vehicle body and is spanned in a space between the door and the vehicle body inside a vehicle room beyond a weather strip. The door wire harness is drawn out of a space between a door inner panel and a door trim at a door side and is fixed on the door at a wire harness drawing-out position. A door side fixing position of the door wire harness is shifted from a vehicle body side fixing position of the door wire harness in a vertical direction. A spanning section of the door wire harness between the door side fixing position and the vehicle body side fixing position is sheathed by a grommet having a flexible bellows-like tube portion and made of rubber or resin. The spanning section of the door wire harness is bent in an S-shaped configuration in a space between opposed surfaces of the door and the vehicle body when the door is closed. The door wire harness is changed from the S-shaped configuration to a straight line configuration when the door is opened.

8 Claims, 5 Drawing Sheets

FIG. 2A
(A)
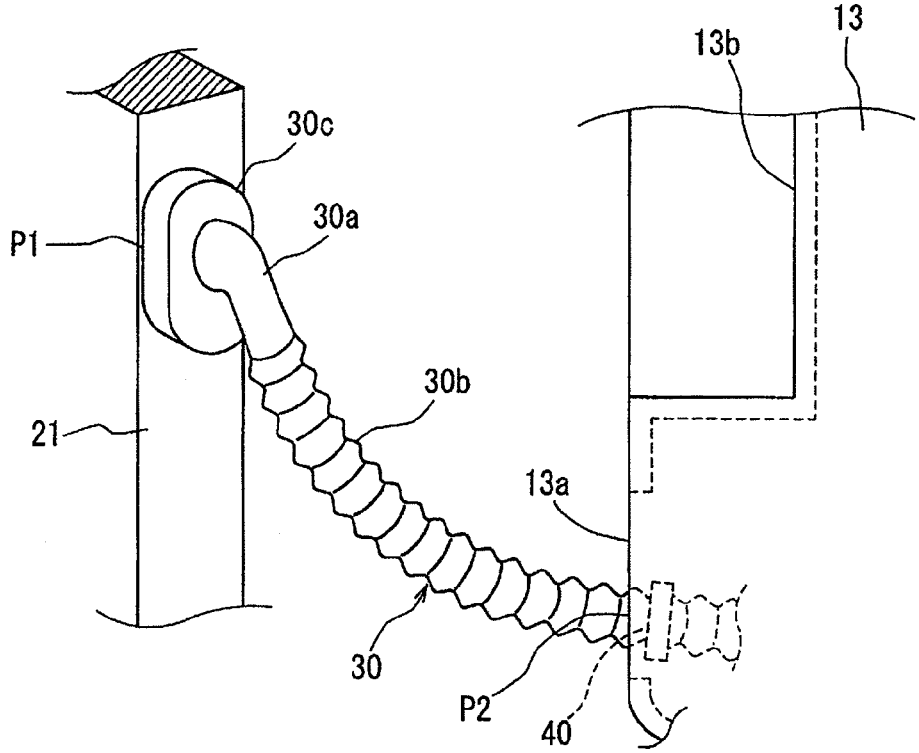
(B)
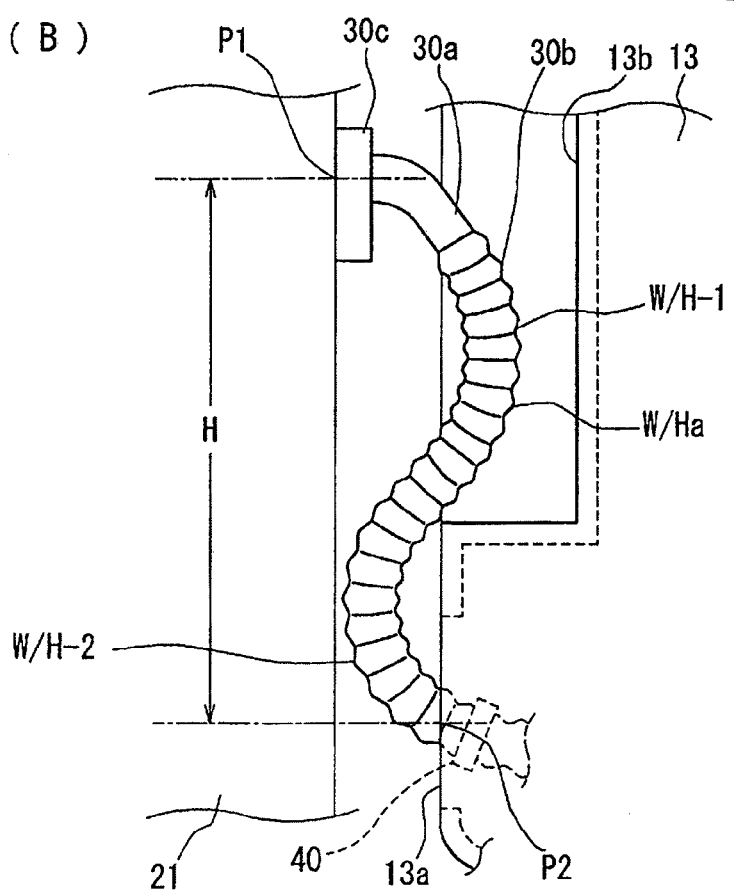
FIG. 2B

FIG. 3A
(A)
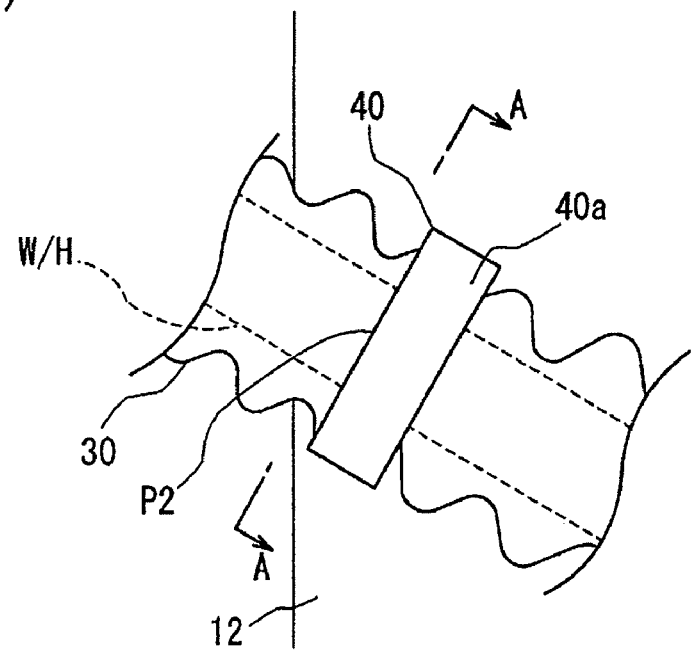
(B)
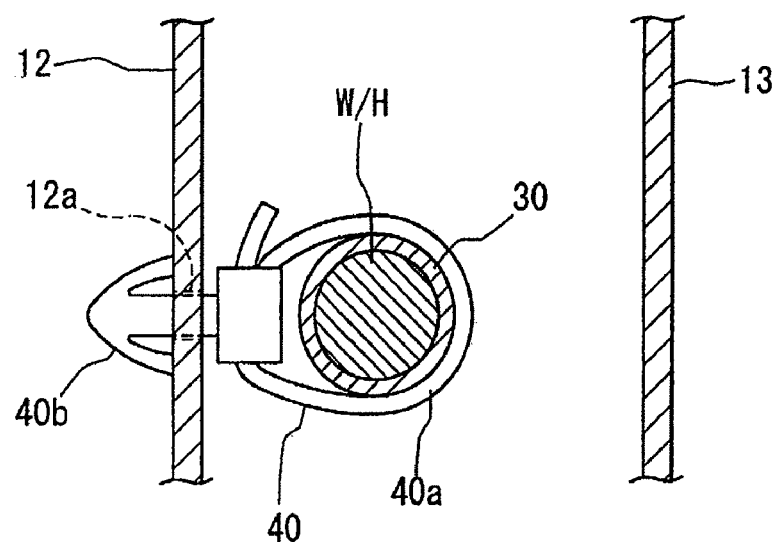
FIG. 3B

FIG. 6            Prior Art
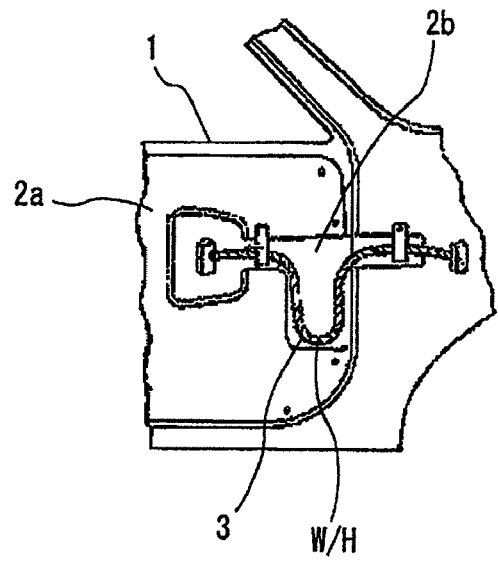
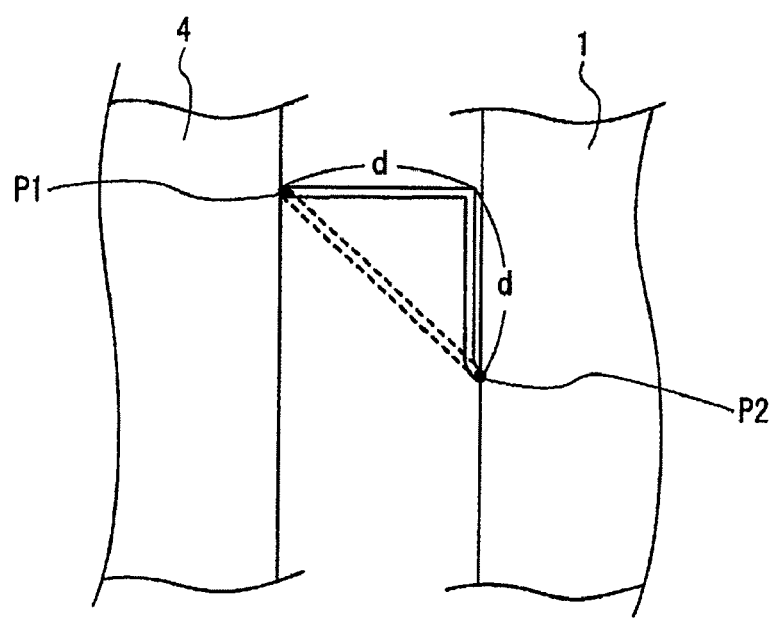
FIG. 7            Prior Art

ARRANGEMENT STRUCTURE OF DOOR WIRE HARNESS

FIELD OF THE INVENTION

This invention relates to an arrangement structure for a door wire harness, and more particularly relates to the arrangement structure that can absorb a surplus length of a door wire harness arranged inside a vehicle room beyond a weather strip between a door and a vehicle body without using any member for absorbing the surplus length of the door wire harness.

BACKGROUND OF THE INVENTION

Heretofore, in many cases, a door wire harness is arranged in a side door and is led out to a vehicle body side. The door wire harness is arranged in a space defined between a door outer panel and a door inner panel. The door wire harness is threaded through a grommet fitted in a through hole provided in a vehicle body side end surface of a door inner panel and in a through-hole provided in a vehicle body outer panel to be spanned from the door to a vehicle body. However, a work of threading the wire harness through the through-holes has been very hard.

In order to overcome the above problem, various structures have been proposed. In the proposed structure, the door wire harness is arranged from a space between a vehicle room side of a door inner panel and a door trim to a vehicle body side so as not to thread the wire harness through a through-hole. If a through-hole is not provided in a door frame and a door wire harness is arranged from a vehicle body side to a door side, an arrangement position of the door wire harness is displaced from a hinge-coupling position between the vehicle body and the door to a door side. Since this causes the door wire harness to expand and contract between the vehicle body and the door, it is necessary to absorb a surplus length of the door wire harness.

Japanese Utility Model Publication SHO 58 (1983)-20405 (JUM SHO 58 (1983)-20405 A; Patent Document 1) has disclosed a wiring and piping structure of a door wire harness onto a motor vehicle door that has a function of absorbing a surplus length of the door wire harness. In such function of absorbing a surplus length in the wiring and piping structure, as shown in FIG. 6, an inner plate $2a$ of a door panel is provided with a containing recess $2b$ dented in an outward direction from a vehicle body. When a door 1 is closed, a central part 3 of a door wire harness W/H is bent into the containing recess $2b$ to absorb the surplus length of the door wire harness W/H when the door 1 is closed.

However, in the wiring and piping structure on the motor vehicle door disclosed in Patent Document 1, since the door wire harness W/H is disposed in the containing recess $2b$ without fixing the door wire harness W/H to the inner plate $2a$, the central part 3 of the door wire harness W/H will swing at the time of opening and closing the door 1 or during moving. Consequently, there is a possibility that interference between the door wire harness W/H and the inner plate $2a$ will cause unusual sounds and the door wire harness W/H will wear on account of a contacting friction.

Further, in order to overcome the above problem, there is an idea of absorbing the surplus length of the door wire harness in a spanning arrangement position between the door and the vehicle body.

For example, as shown in FIG. 7, a fixing position P1 at a side of a vehicle body 4 is disposed above a fixing position P2 at a side of the door 1 and the spanning arrangement portion is bent in a rectangular shape to absorb the surplus length of the door wire harness when the door 1 is closed. In this case, assuming that a sign "d" denotes a distance between the vehicle body 4 and the door 1 or a length of a side of the bent door wire harness when the door 1 is closed, the surplus length becomes $2d-(1^2+1^2)^{1/2}d$=about 0.59d. Accordingly, if the surplus length is 100 mm, distance "d" between the door 1 and the vehicle body 4, which can absorb the surplus length, will become 169.5 mm. This will cause a wide clearance between the door 1 and the vehicle body 4 even if the door 1 is closed. In result, the above arrangement structure is not practical.

Patent Document 1: JUM SHO 58 (1983)-20405 A

SUMMARY OF THE INVENTION

Object to be Achieved by the Invention

In view of the above problems, an object of the present invention is to provide an arrangement structure for a door wire harness that can absorb a surplus length of a door wire harness between a vehicle body and a door in a absorbing structure of a surplus length of the wire harness.

Means for Solving the Problems

In order to solve the above problems, the present invention is directed to an arrangement structure for a door wire harness. The door wire harness is arranged in a door of a vehicle body and is spanned in a space between the door and the vehicle body inside a vehicle room beyond a weather strip. The door wire harness is drawn out of a space between a door inner panel and a door trim at a door side and is fixed on the door at a wire harness drawing-out position. A door side fixing position of the door wire harness is shifted from a vehicle body side fixing position of the door wire harness in a vertical direction. A spanning section of the door wire harness between the door side fixing position and the vehicle body side fixing position is sheathed by a grommet having a flexible bellows-like tube portion and made of rubber or resin. The spanning section of the door wire harness is bent in an S-shaped configuration in a space between opposed surfaces of the door and the vehicle body when the door is closed. The door wire harness is changed from the S-shaped configuration to a straight line configuration when the door is opened.

According to the arrangement structure of the present invention, the vehicle body side fixing position and the door side fixing position of the door wire harness are shifted from each other in the vertical direction and the door wire harness is bent in the space between the door and the vehicle body to absorb the surplus length of the door wire harness. On the contrary, in the conventional arrangement structure, the door is provided with a surplus length absorbing space to absorb the surplus length of the door wire harness.

According to the above construction, it is not necessary to provide the surplus length absorbing space in the door to absorb displacement of the surplus length caused in connection with opening and closing operations of the door and it is possible to readily absorb the surplus length of the door wire harness in the space between the door and the vehicle body.

Also, since the door wire harness is fixed on the wire harness drawing-out position, it is possible to prevent the door wire harness from swinging at the wire harness drawing-out position when the door is opened, thereby preventing the door wire harness from interfering with the door inner panel or the door trim. Since the arranging direction of the spanning section of the door wire harness is in parallel to the door when the door is closed, it is possible to prevent the spanning section from interfering with the door inner panel or the door trim.

Preferably, a single containing recess is provided in one of the opposed surfaces of the vehicle body and the door trim through the space, or two containing recesses are provided in both of the opposed surfaces so that the two containing recesses are shifted from each other in a vertical direction. A part or parts of the S-shaped configuration of the door wire harness is or are housed in the single containing recess or the two containing recesses when the door is closed.

When the door is closed, the spanning section of the door wire harness is bent in the S-shaped configuration and bent portions protrude toward the door side and the vehicle side in the vertical direction. As described above, since the containing recesses are provided in both opposed surfaces of the vehicle body and the door and the bent portions are housed in the containing recesses, it is possible to prevent the bent portions from interfering with the vehicle body or the door trim and to reduce a clearance between the door and the vehicle body.

Preferably, the grommet has bellows-like tube portions at a door side end and an intermediate part and has a straight tube portion at a vehicle body side end. The straight tube portion of the grommet at the vehicle body side end is slanted upward or downward. The bellows-like tube portion of the grommet at the door side fixing position is slanted downward or upward by a band clip and is fixed on the door. A bending direction of the spanning section of the door wire harness is restrained at the door side fixing position and the vehicle body side fixing position.

Since an orientation of the grommet is restrained at the vehicle body side and the door side, it is possible to surely change the straight line configuration of the spanning section of the door wire harness at the time of opening the door to the S-shaped configuration having upper and lower bent portions at the time of closing the door.

It is not limited that the grommet is secured to the door by the band clip. A plate-like clip that protrudes an engagement portion may be attached to the grommet by winding a tape and the engagement portion may be locked on the door trim or the door inner panel. Alternatively, the door trim may be provided with an opening, a door side end of the grommet may be fitted into the opening, and the grommet may be held on the door trim.

Preferably, a difference in height between the vehicle body side fixing position and the door side fixing position is set to be 80 to 200 mm, and more preferably it is set to be 120 to 160 mm.

Preferably, the door side fixing position is disposed at a lower position while the vehicle body side fixing position is disposed at an upper position.

According to the above construction, although the door wire harness was arranged on a lower position in the door at a vehicle body drawing-out side in the prior art, the door wire harness to be arranged in the door can be led into the space between the vehicle body and the door without routing the door wire harness in the door.

EFFECTS OF THE INVENTION

As described above, according to the present invention, it is not necessary to provide the surplus length absorbing space in the door to absorb displacement of the surplus length caused in connection with opening and closing operations of the door and it is possible to readily absorb the surplus length of the door wire harness in the space between the door and the vehicle body. It is also possible to prevent the door wire harness from swinging at the wire harness drawing-out position when the door is opened, thereby preventing the door wire harness from interfering with the door inner panel or the door trim. Since the arranging direction of the spanning section of the door wire harness is in parallel to the door when the door is closed, it is possible to prevent the spanning section from interfering with the door inner panel or the door trim.

Further, if the containing recesses are provided in the opposed surfaces of the vehicle body and the door trim through the space between the vehicle body and the door, the bent portions can be housed in the containing recesses, thereby preventing the bent portions from interfering with the vehicle body or the door trim and reducing a clearance between the door and the vehicle body.

In addition, if the grommet is slanted upward and downward at the vehicle body side and the door side, it is possible to change the straight line configuration of the door wire harness at the time of opening the door to the S-shaped configuration of the door wire harness having the bent portions in the vertical direction at the time of closing the door.

BRIEF DESCRIPTION OF THE DRAWINGS

FIG. 2A is a side elevation view of the arrangement structure for the door wire harness, illustrating an arrangement condition when the door is opened. FIG. 2B is a side elevation view of the arrangement structure for the door wire harness, illustrating an arrangement condition when the door is closed.

FIG. 3A is an enlarged side elevation view of a main part of the arrangement structure, illustrating a door side fixing position. FIG. 3B is a cross section view taken along lines A-A in FIG. 3A.

FIG. 6 is a side elevation view of a conventional arrangement structure for a door wire harness.

FIG. 7 is a side elevation view of another conventional arrangement structure for a door wire harness.

Figure 1:
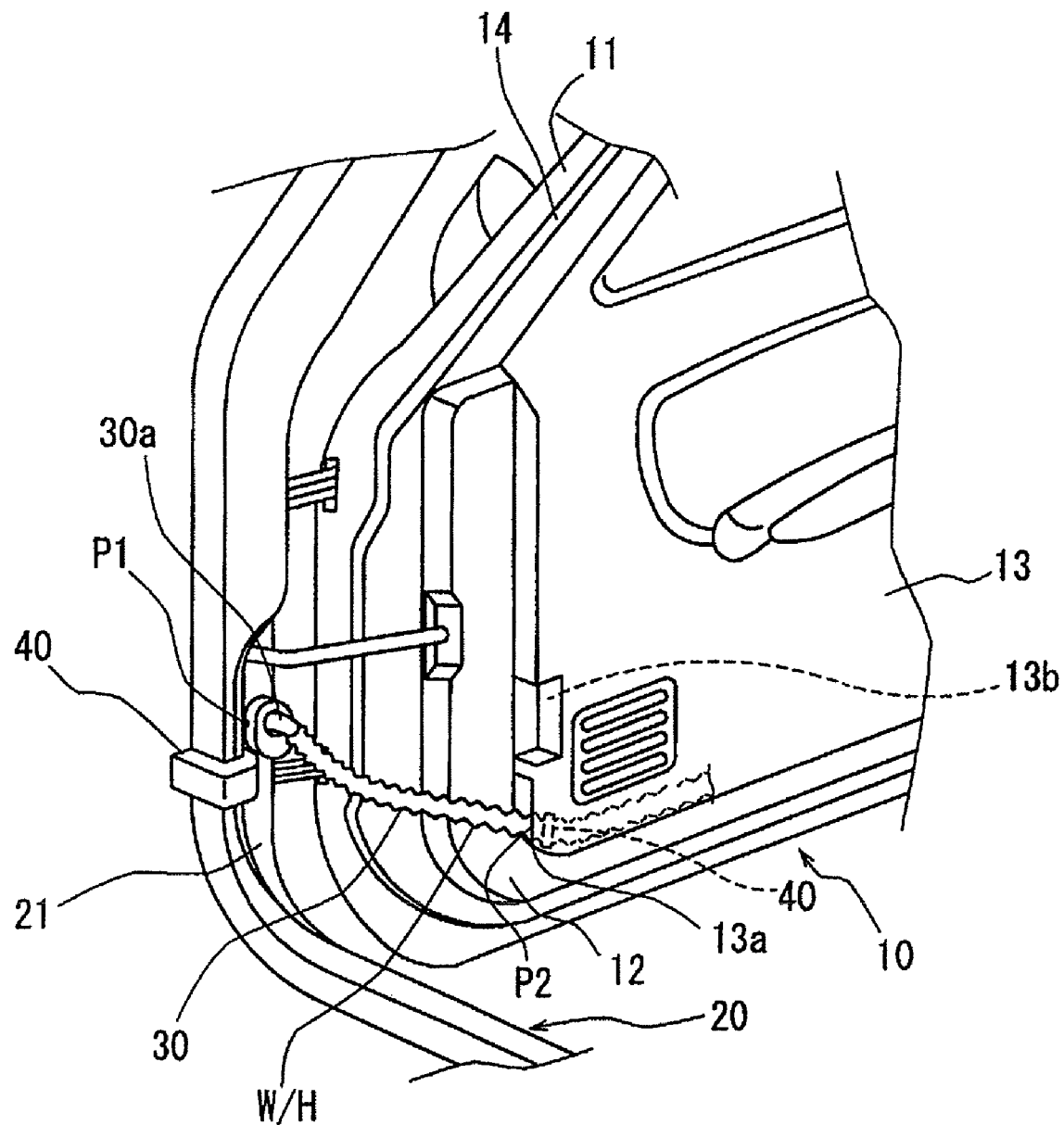
FIG. 1 is a perspective view of a first embodiment of an arrangement structure for a door wire harness in accordance with the present invention.

EXPLANATION OF SIGNS 10 door
11 door outer panel
13 door trim
13b containing recess
14 weather strip
20 vehicle body
21 vehicle body outer panel
21a containing recess
30 grommet
30a straight tube portion
30b bellows-like tube portion
40 band clip
P1 vehicle body side fixing position
P2 door side fixing position
W/H door wire harness

DETAILED DESCRIPTION OF THE INVENTION

Embodiments of an arrangement structure for a door wire harness in accordance with the present invention will be explained below.

FIGS. 1 to 4 show a first embodiment of an arrangement structure for a door wire harness in accordance with the present invention.

A door wire harness W/H is arranged in a side door (hereinafter referred to a "door") 10. The door wire harness W/H is spanned from the door 10 to a vehicle body 20. A grommet 30 sheathes the door wire harness W/H spanned between the door 10 and the vehicle body 20. The wire harness W/H is arranged on a vehicle room side of the door 10.

As shown in FIG. 1, the door wire harness W/H is arranged on a vehicle body side of a door inner panel 12 connected to a door outer panel 11 at a side of the door 10, is contained between the door inner panel 12 and a door trim 13 mounted on a vehicle room side of the door inner panel 12, and is drawn out of an opening in the door trim 13 to the vehicle body 20. The door wire harness W/H is spanned between the door 10 and the vehicle body 20 at the vehicle room side beyond a weather strip 14 provided on the door 10.

The door wire harness W/H is drawn out of a space between the door inner panel 12 and the door trim 13 at the door side and is fixed on the door inner panel 12 at a wire harness drawing-out position. A door side fixing position P2 is disposed below a vehicle body side fixing position P1. Thus, the positions P1 and P2 are shifted from each other in a vertical direction. As shown in FIG. 2B, a difference H in height between the vehicle body side fixing position P1 and the door side fixing position P2 is set to be 130 mm in the first embodiment.

The door side fixing position P2 may be disposed above the vehicle body side fixing position P1.

The grommet 30 that sheathes the spanning section of the door wire harness W/H is made of rubber or elastomer. As shown in FIGS. 2A and 2B, a vehicle body side distal end of the grommet 30 is formed into a straight tube portion 30a while a door side end and an intermediate part of the grommet 30 are formed into flexible bellows-like tube portions 30b. The grommet 30 is locked on a vehicle body outer panel 21 by an engagement portion 30c provided on a vehicle body side end of the straight tube portion 30a. The straight tube portion 30a at the side of the vehicle body 20 slants downward from the vehicle body outer panel 21 to force the door wire harness W/H to bend downward.

As shown in FIGS. 3A and 3B, at the door side fixing position P2 of the grommet 30, a band portion 40a of a band clip 40 is wound around the grommet 30 to secure it to the door wire harness W/H, a vehicle body engagement portion 40b that projects from the band portion 40a is inserted into and secured to an engagement hole 12a in the inner panel 12 of the door 10, and the door wire harness W/H is fixed on the inner panel 12 with the wire harness W/H being slanted upward to the vehicle body 20.

That is, the door wire harness W/H is slanted downward at the vehicle body side fixing position P1 while the door wire harness W/H is slanted upward at the door side fixing position P2, in order to restrain the bending direction of the door wire harness W/H at the spanning section.

The door trim 13 of the door 10 is opposed to the inner panel 12 through a space between the door 10 and the vehicle body 20. The door trim 13 is provided in an upper part with a rectangular containing recess 13b so that the containing recess 13b can house a first bending portion W/H-1 (mentioned after) of the door wire harness W/H.

Next, an operation of the door wire harness W/H will be explained in connection with the opening and closing operations of the door 10.

When the door 10 is opened, as shown in FIG. 1 and FIG. 2A, the door wire harness W/H is brought into a straight line configuration at the spanning section from the door side fixing position P2 to the vehicle body side fixing position P1.

On the other hand, when the door 10 is closed, as shown in FIG. 2B, a surplus length W/Ha of the door wire harness W/H is generated at the spanning section. The surplus length W/Ha is bent in an S-shaped configuration by restraining the bending direction from the door side fixing position P2 to the vehicle body side fixing position P1 mentioned above. A first bending portion W/H-1 is made at an upper position at the side of the door 10 while a second bending portion W/H-2 is made at a lower position of the side of the vehicle body 20.

Under this condition, the first bending portion W/H-1 is housed in the containing recess 13b at the side of the door 10. On the other hand, the second bending portion W/H-2 is housed in a space between the door 10 and the vehicle body 20. Thus, the surplus length W/Ha of the spanning section of the door wire harness W/H is housed in the space between the door 10 and the vehicle body 20.

As described above, in the arrangement structure for the door wire harness in accordance with the present invention, the door side fixing position P2 and the vehicle body side fixing position P1 are shifted from each other in the vertical direction and the door wire harness W/H is bent in the S-shaped configuration in the space between the vehicle body outer panel 21 and the door inner panel 12 to absorb the surplus length of the door wire harness W/H. Consequently, it is not necessary to provide the door trim 13 in the interior with a space for absorbing a surplus length of the door wire harness on account of movement of the surplus length W/Ha upon opening and closing the door. The arrangement structure of the present invention can readily absorb the surplus length W/Ha of the door wire harness W/H. Further, since the door wire harness W/H is secured to the door 10 by the band clip 40 at the wire harness drawing-out position, it is possible to prevent the wire harness W/H from swinging at the wire harness drawing-out position when the door is opened, thereby preventing the door wire harness W/H from interfering with the door inner panel 12 or the door trim 13.

Since the arranging direction of the spanning section of the door wire harness W/H is in parallel to the door 10 even if the door is closed, it is possible to prevent the spanning section of the door wire harness W/H from interfering with the door inner panel 12 or the door trim 13.

Figure 4:
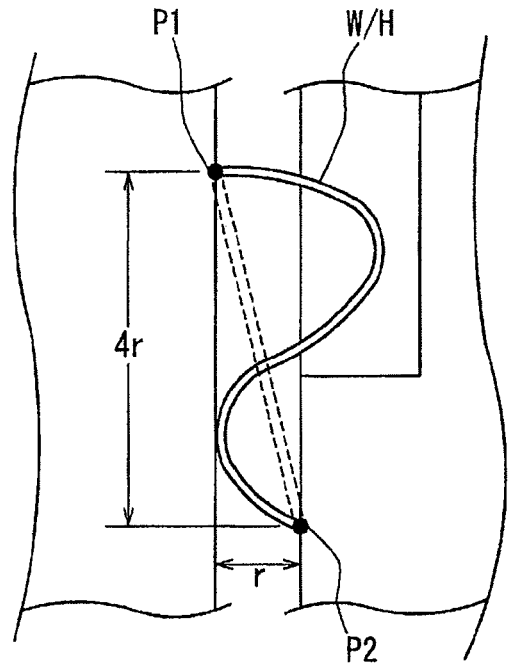
FIG. 4 is a side elevation view of the arrangement structure, illustrating a relationship between a length from the door to a vehicle body and a surplus length of the door wire harness.

In addition, since the door trim 13 is provided with the containing recess 13b, the first bending portion W/H-1 is housed in the containing recess 13b when the door 10 is closed, and the surplus length W/Ha is bent in the S-shaped configuration, it is possible to reduce a distance between the door 10 and the vehicle body 20 when the door 10 is closed. For example, as shown in FIG. 4, assuming that a sign "r" designates a distance between the vehicle body 20 and the door 10 when the door 10 is closed, a whole length of the S-shaped portion of the spanning section is about 2.r, and the surplus length W/Ha is 2.r−4r=2.28r. If the surplus length W/Ha is 100 mm, a distance d that can absorb the surplus length W/Ha between the door 10 and the vehicle body 20 is about 43.8 mm. The distance d is about one-fourth of a conventional distance d (169.5 mm) in the case where the spanning section is bent rectangularly to absorb the surplus length (see FIG. 7).

Further, if the grommet 30 is slanted in the vertical direction between the vehicle body 20 and the door 10, the door wire harness W/H is formed into the straight line configuration when the door 10 is opened while the door wire harness W/H is formed into the S-shaped line configuration about the central part when the door 10 is closed.

Figure 5:
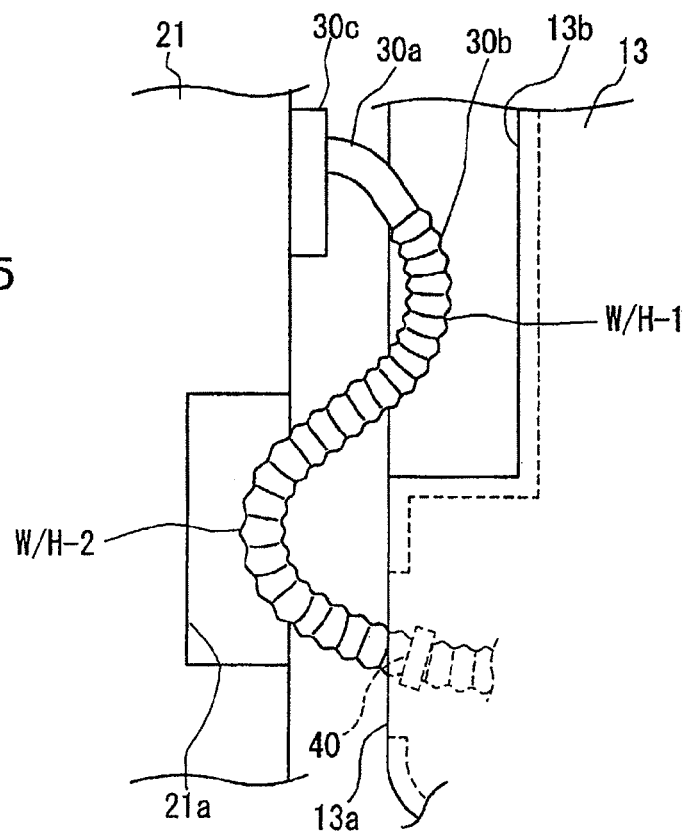
FIG. 5 is a side elevation view of a second embodiment of the arrangement structure for the door wire harness in accordance with the present invention.

FIG. 5 shows a second embodiment of an arrangement structure for a door wire harness in accordance with the present invention.

The arrangement structure of the second embodiment is different from that of the first embodiment with respect to the fact that the door trim 13 of the door 10 is provided with a containing recess 13b and the vehicle body outer panel 21 is provided in a lower part with a containing recess 21a below the containing recess 13b in the vertical direction.

When the door 10 is closed, the first bent portion W/H-1 of the surplus length W/Ha is housed in the containing recess 13b in the door trim 13 while the second bent portion W/H-2 of the surplus length W/Ha is housed in the containing recess 21a in the vehicle body outer panel 21.

Since the other constructions and operational effects in the second embodiment are the same as those in the first embodiment, their explanations are omitted by giving the same signs to the same elements.

The invention claimed is:

1. An arrangement structure for a door wire harness, said door wire harness being arranged in a door of a vehicle body and spanning across a space between the door and the vehicle body, the door forming a door side and including a door inner panel and a door trim;
   wherein said door wire harness extends outwardly from a space between said door inner panel and said door trim at the door side and is fixed on said door at a wire harness drawing-out position, a door side fixing position of said door wire harness is vertically offset from a vehicle body side fixing position of said door wire harness, and a spanning section of said door wire harness between said door side fixing position and said vehicle body side fixing position is sheathed by a grommet having a flexible tubular bellows portion made of rubber or resin;
   wherein either a single containing recess is provided in said door trim, or two vertically offset containing recesses are provided, one in each of said opposed surfaces of said vehicle body and said door trim; and
   wherein said spanning section of said door wire harness is bent in an S-shaped configuration in a space between said opposed surfaces of said door and said vehicle body when said door is closed, a portion of said S-shaped configuration of said door wire harness being housed in said single containing recess, or portions of said S-shaped configuration of said door wire harness being housed in each of said two vertically offset containing recesses, and said door wire harness is changed from said S-shaped configuration to a substantially straight configuration when said door is opened.

2. The arrangement structure for a door wire harness according to claim 1, wherein said grommet has said tubular bellows portions at a door side end and an intermediate part, and said grommet has a straight tubular portion at a vehicle body side end, said straight tubular portion of said grommet at said vehicle body side end being slanted in a downward direction, said tubular bellows portion of said grommet at said door side fixing position being slanted in an upward direction by a band clip fixed on said door, and a bending direction of said spanning section of said door wire harness being restrained at said door side fixing position and said vehicle body side fixing position.

3. The arrangement structure for a door wire harness according to claim 1, wherein a difference in height between said vehicle body side fixing position and said door side fixing position is 80 to 200 mm.

4. The arrangement structure for a door wire harness according to claim 1, wherein said door side fixing position is disposed at a lower position while said vehicle body side fixing position is disposed at an upper position.

5. The arrangement structure for a door wire harness according to claim 2, wherein a difference in height between said vehicle body side fixing position and said door side fixing position is 80 to 200 mm.

6. The arrangement structure for a door wire harness according to claim 2, wherein said door side fixing position is disposed at a lower position while said vehicle body side fixing position is disposed at an upper position.

7. The arrangement structure for a door wire harness according to claim 3, wherein said door side fixing position is disposed at a lower position while said vehicle body side fixing position is disposed at an upper position.

8. The arrangement structure for a door wire harness according to claim 5, wherein said door side fixing position is disposed at a lower position while said vehicle body side fixing position is disposed at an upper position.

* * * * *